US012736188B2

(12) United States Patent
Fujioka

(10) Patent No.: US 12,736,188 B2
(45) Date of Patent: Sep. 15, 2026

(54) FUEL GAS STORAGE SYSTEM

(71) Applicant: TOYOTA JIDOSHA KABUSHIKI KAISHA, Toyota (JP)

(72) Inventor: Hisaya Fujioka, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/060,924

(22) Filed: Feb. 24, 2025

(65) Prior Publication Data

US 2025/0389392 A1 Dec. 25, 2025

(30) Foreign Application Priority Data

Jun. 21, 2024 (JP) ................................ 2024-100492

(51) Int. Cl.
*F17C 13/04* (2006.01)

(52) U.S. Cl.
CPC .... *F17C 13/045* (2013.01); *F17C 2205/0142* (2013.01); *F17C 2205/0388* (2013.01); *F17C 2221/012* (2013.01); *F17C 2250/043* (2013.01); *F17C 2250/0473* (2013.01); *F17C 2250/0636* (2013.01); *F17C 2270/0763* (2013.01)

(58) Field of Classification Search
CPC ............ F17C 13/045; F17C 2205/0142; F17C 2205/0388; F17C 2221/012; F17C 2250/043; F17C 2250/0473; F17C 2250/0636; F17C 2270/0763
USPC .......................................................... 141/192
See application file for complete search history.

(56) References Cited

U.S. PATENT DOCUMENTS

| | | | | |
|---|---|---|---|---|
| 2004/0118476 A1* | 6/2004 | Borck | F17C 5/06 | 141/4 |
| 2004/0163731 A1* | 8/2004 | Eichelberger | F17C 1/00 | 141/284 |
| 2010/0266920 A1* | 10/2010 | Kanie | H01M 8/04664 | 429/430 |
| 2017/0352903 A1* | 12/2017 | Yoshimura | H01M 8/04201 | |
| 2018/0269499 A1* | 9/2018 | Saito | H01M 8/04955 | |
| 2021/0317952 A1* | 10/2021 | Allidieres | F17C 5/06 | |
| 2022/0120383 A1* | 4/2022 | Werlen | F17C 5/06 | |
| 2023/0253586 A1* | 8/2023 | Inoue | H01M 8/04225 | 429/429 |

(Continued)

FOREIGN PATENT DOCUMENTS

| | | |
|---|---|---|
| JP | 2003-097795 A | 4/2003 |
| JP | 2005-069329 A | 3/2005 |

*Primary Examiner* — Christopher M Afful
(74) *Attorney, Agent, or Firm* — SoraIP, Inc.

(57) ABSTRACT

A fuel gas storage system includes a first tank including a first supply valve and a first communication valve. The fuel gas storage system includes a second tank including a second supply valve and a second communication valve. The fuel gas storage system includes a supply pipe connecting the first supply valve and the second supply valve to an external device. The fuel gas storage system includes a communication pipe connecting the first communication valve and the second communication valve to each other. The fuel gas storage system includes a control unit configured to be able to control an opened-closed state of each of the first supply valve, the second supply valve, the first communication valve, and the second communication valve. The control unit is configured to be able to execute specific control.

5 Claims, 4 Drawing Sheets

(56) References Cited

U.S. PATENT DOCUMENTS

2024/0183496 A1* 6/2024 Oshima .................. F17C 5/007

* cited by examiner

FUEL GAS STORAGE SYSTEM

CROSS-REFERENCE TO RELATED APPLICATION

This application claims priority to Japanese Patent Application No. 2024-100492 filed on Jun. 21, 2024. The disclosure of the above-identified application, including the specification, drawings, and claims, is incorporated by reference herein in its entirety.

BACKGROUND

1. Technical Field

The technique disclosed in the present specification relates to a fuel gas storage system.

2. Description of Related Art

Japanese Unexamined Patent Application Publication No. 2003-97795 (JP 2003-97795 A) discloses a fuel gas storage device including a plurality of tanks. The tanks are each provided with a valve. The tanks are connected to a supply pipe via the valve. The supply pipe is connected to an external device to which fuel gas is to be supplied.

SUMMARY

In some cases it may be preferable not to open and close a valve of a tank. For example, such cases may be when the valve is broken or when the valve is opened and closed frequently. In these cases, fuel gas cannot be supplied from a tank including a valve that is not opened or closed.

A fuel gas storage system disclosed in the present specification includes a first tank configured to be able to store fuel gas and including a first supply valve and a first communication valve. The fuel gas storage system includes a second tank configured to be able to store the fuel gas and including a second supply valve and a second communication valve. The fuel gas storage system includes a supply pipe connecting the first supply valve and the second supply valve to an external device. The fuel gas storage system includes a communication pipe connecting the first communication valve and the second communication valve to each other. The fuel gas storage system includes a control unit configured to be able to control an opened-closed state of each of the first supply valve, the second supply valve, the first communication valve, and the second communication valve. The control unit is configured to be able to execute specific control to close the first supply valve, and open the first communication valve, the second communication valve, and the second supply valve.

According to the above configuration, when the first supply valve is not operated, the fuel gas in the first tank can be supplied to an external device using a path that passes through the first communication valve, the communication pipe, the second communication valve, the second tank, the second supply valve, and the supply pipe. Even when the first supply valve is not operated, the fuel gas can be supplied from the first tank. This makes it possible to effectively utilize the fuel gas stored in the first tank.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Additional features of the fuel gas storage system disclosed in the present specification are described hereinafter.

The control unit may be configured to be able to execute the specific control when a failure of the first supply valve is detected.

According to the above configuration, even when the first supply valve is failed, it is possible to supply the fuel gas from the first tank to the external device.

The control unit may be further configured to be able to detect the number of times the first supply valve is operated. The control unit may be configured to be able to execute the specific control when the number of times the first supply valve is operated exceeds a predetermined number of times.

According to the above configuration, it is possible to supply the fuel gas from the first tank to the external device while reducing the number of times the first supply valve is operated.

The control unit may be configured to be able to execute the specific control when pressure in the second tank is lower than pressure in the first tank.

According to the above configuration, it is possible to appropriately transfer the fuel gas in the first tank to the second tank by using a pressure difference.

The first supply valve may be disposed at one end of the first tank, and the first communication valve may be disposed at another end of the first tank. The second supply valve may be disposed at one end of the second tank, and the second communication valve may be disposed at another end of the second tank.

First Embodiment

Schematic Configuration of Fuel Cell System 1 and Fuel Gas Storage System 2

Figure 1:
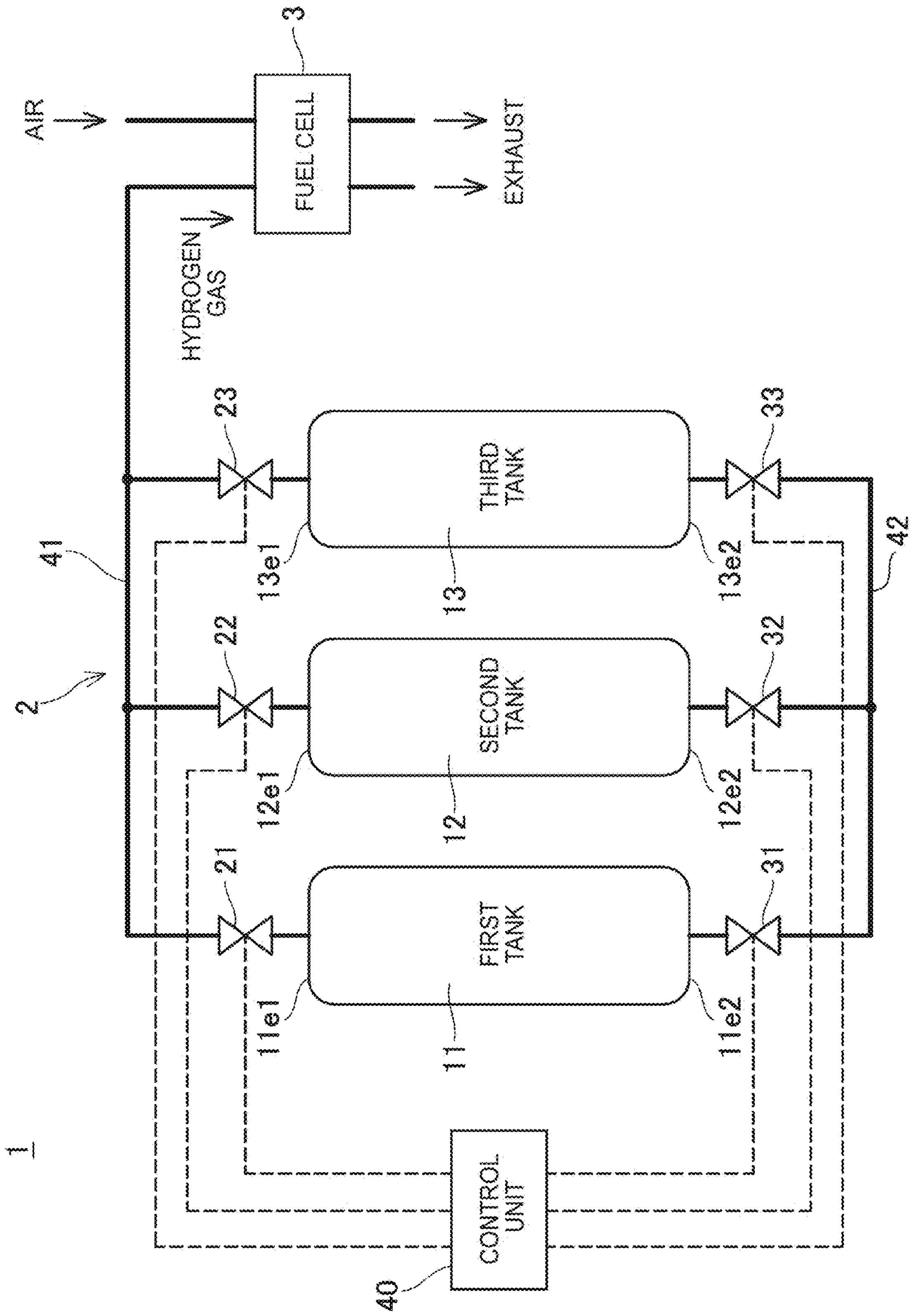
FIG. 1 is a diagram illustrating a schematic configuration of a fuel cell system 1.

FIG. 1 illustrates a schematic configuration of a fuel cell system 1 according to the embodiment. The fuel cell system 1 includes a fuel gas storage system 2 and a fuel cell 3. The fuel cell 3 is connected to the fuel gas storage system 2 via a supply pipe 41. Hydrogen gas is supplied from the fuel gas storage system 2 to the fuel cell 3. Since the configuration of the fuel cell 3 is well known, a detailed description thereof will be omitted.

The fuel gas storage system 2 mainly includes a first tank 11, a second tank 12, a third tank 13, and a control unit 40. The first tank 11, the second tank 12, and the third tank 13 are configured to be able to store fuel gas. The fuel gas stored may be of various types. In the embodiment, the fuel gas is hydrogen gas.

The first tank 11 includes a first supply valve 21 and a first communication valve 31. The first supply valve 21 is disposed at an end 11$e$1 on one end side of the first tank 11. The first communication valve 31 is disposed at an end 11$e$2 on the other end side of the first tank 11. Similarly, the second tank 12 includes a second supply valve 22 and a second communication valve 32. The second supply valve 22 is disposed at an end 12*e*1 on one end side of the second tank 12, and the second communication valve 32 is disposed at an end 12*e*2 on the other end side of the second tank 12. Similarly, the third tank 13 includes a third supply valve 23 and a third communication valve 33. The third supply valve 23 is disposed at an end 13*e*1 on one end side of the third tank 13, and the third communication valve 33 is disposed at an end 13*e*2 on the other end side of the third tank 13.

A supply pipe 41 connects the first supply valve 21, the second supply valve 22, and the third supply valve 23 to the fuel cell 3 serving as an external device. A communication pipe 42 connects the first communication valve 31, the second communication valve 32, and the third communication valve 33 to each other. That is, the first tank 11, the second tank 12, and the third tank 13 are commonly connected to each other by the communication pipe 42.

The control unit 40 is connected to each of the first supply valve 21, the second supply valve 22, the third supply valve 23, and the first communication valve 31, the second communication valve 32, and the third communication valve 33 so as to be able to communicate with each other. In FIG. 1, communication paths are indicated by dotted lines. The control unit 40 is a portion capable of controlling the opened-closed state of each of these six valves. The control unit 40 is also configured to be able to count the number of times each of these six valves is opened and closed, and to detect the presence or absence of a failure. The control unit 40 is also configured to be able to detect the internal pressure and remaining amount of gas in each of the first tank 11, the second tank 12, and the third tank 13.

In addition, the fuel gas storage system 2 may be provided with various devices such as a high-pressure regulator for keeping the pressure of discharged gas constant, and a relief valve for relieving excess pressure in the tank.

Operation of Fuel Gas Storage System 2

Figure 2:
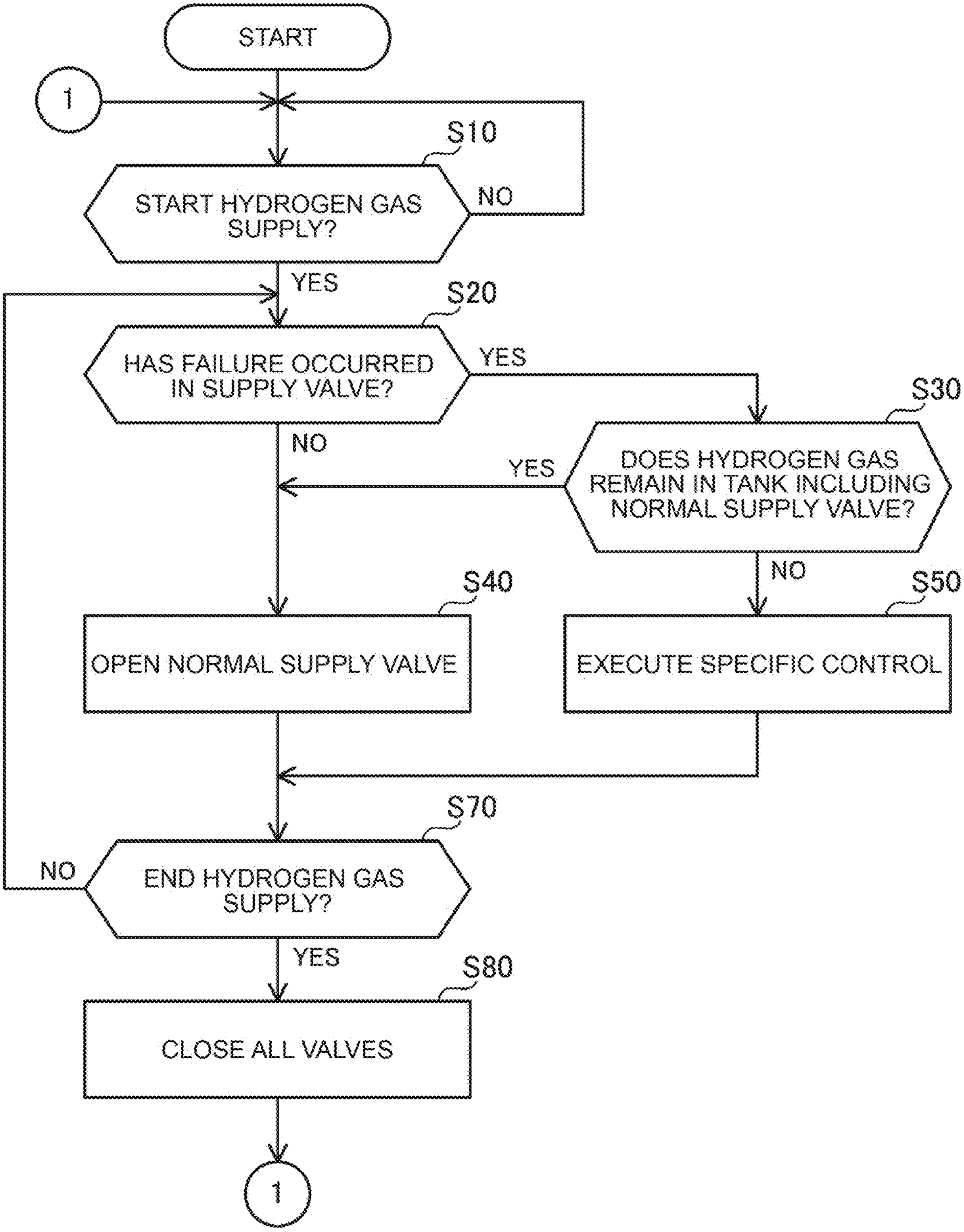
FIG. 2 is a flowchart illustrating an operation of a fuel gas storage system 2.

An operation of the fuel gas storage system 2 will be described with reference to the flowchart in FIG. 2. In the initial state before the flowchart starts, all valves are closed. In step S10, the control unit 40 determines whether to start supplying hydrogen gas to the fuel cell 3. When a negative determination is made (S10: NO), the process waits, and when a positive determination is made (S10: YES), the process proceeds to step S20.

In step S20, the control unit 40 determines whether a failure has occurred in at least one of the first supply valve 21, the second supply valve 22, and the third supply valve 23. The failure may be of various types. For example, the failure includes a closing failure, a failure that results in insufficient opening, and a failure that results in long opening and closing times. When no failure has occurred (S20: NO), the process proceeds to step S40. When a failure has occurred (S20: YES), the process proceeds to step S30.

In step S30, the control unit 40 determines whether hydrogen gas remains in the tank including a normal supply valve. When hydrogen gas remains in the tank (S30: YES), the process proceeds to step S40. In step S40, the control unit 40 opens the normal supply valve. This allows hydrogen gas to be supplied to the fuel cell 3 from the tank including the normal supply valve. Then the process proceeds to step S70.

When there are multiple tanks including normal supply valves, any one of the tanks may be selected and the supply valve of the selected tank may be opened. The method of selecting the tank may vary. For example, the tank with the highest internal pressure may be selected, the tank with the lowest internal pressure may be selected, or the tank the supply valve of which has the least number of opened and closed times may be selected.

On the other hand, when it is determined in step S30 that no hydrogen gas remains in the tank including a normal supply valve (S30: NO), the process proceeds to step S50. In step S50, the control unit 40 executes specific control. The specific control is a control of forming a gas path that bypasses a failed supply valve. The specific control is executable when a failure is detected in at least one of the first supply valve 21, the second supply valve 22, and the third supply valve 23 (S20: YES).

In the specific control, the failed supply valve is kept closed. In the specific control, the communication valve of the tank including the failed supply valve is opened, and the communication valve and the supply valve of the tank including the normal supply valve are opened. This allows hydrogen gas in the tank including the failed supply valve to be supplied to the fuel cell 3 via the tank including the normal supply valve. Then the process proceeds to step S70.

When there are multiple tanks including normal supply valves, any one of the tanks can be selected and the communication valve and supply valve of the selected tank may be opened. The method of selecting the tank may vary. For example, the tank closest to the failed supply valve may be selected, or the tank the supply valve of which has the least number of opened and closed times may be selected.

In step S70, the control unit 40 determines whether to end the supply of hydrogen gas to the fuel cell 3. When a negative determination is made (S70: NO), the process returns to step S20, and the supply of hydrogen gas continues. On the other hand, when a positive determination is made (S70: YES), the process proceeds to step S80. In step S80, the control unit 40 closes all of the first supply valve 21, the second supply valve 22, the third supply valve 23, the first communication valve 31, the second communication valve 32, and the third communication valve 33. Then, the process returns to step S10.

Specific Operation Example of Fuel Gas Storage System 2

Figure 3:
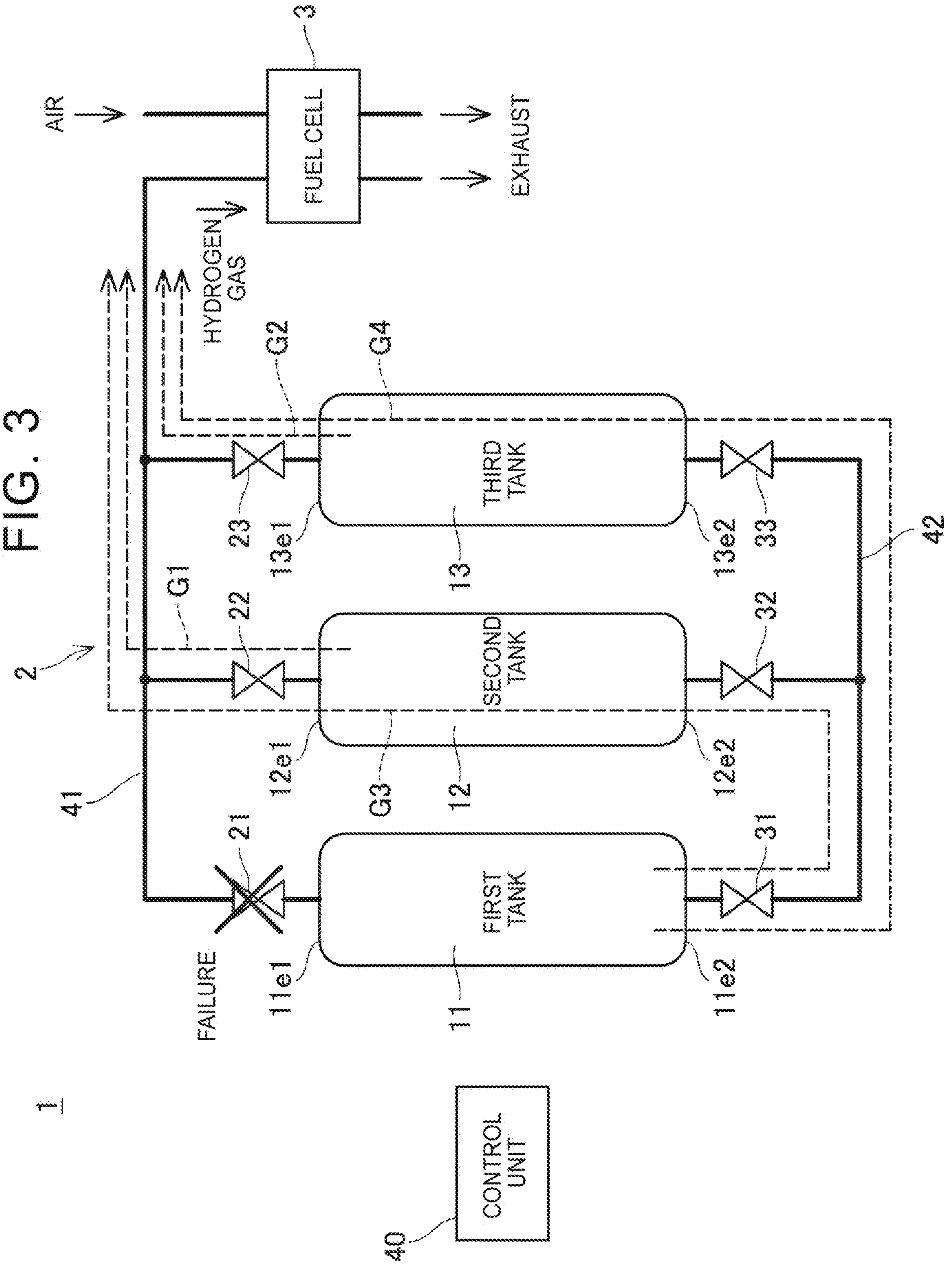
FIG. 3 is a diagram illustrating a specific operation example of the fuel gas storage system 2.

A specific example of the operation of the fuel gas storage system 2 will be described using the specific example in FIG. 3. The specific example in FIG. 3 is an example in which the first supply valve 21 is failed, and the second supply valve 22 and the third supply valve 23 are normal. In this case, in step S20, it is determined that a failure has occurred in the first supply valve 21.

In step S30, it is determined that hydrogen gas remains in the second tank 12 and the third tank 13 that include normal supply valves. Therefore, in step S40, the second supply valve 22 is opened to supply hydrogen gas from the second tank 12 to the fuel cell 3 (see a gas path G1). When the second tank 12 becomes empty, the third supply valve 23 is opened to supply hydrogen gas from the third tank 13 to the fuel cell 3 (see a gas path G2).

When both the second tank 12 and the third tank 13 become empty, it is determined that there is no hydrogen gas remaining in the tanks including the normal supply valves (S30: NO). Therefore, in S50, the specific control is executed. In this operation example, a case will be described in which, of the second tank 12 and the third tank 13 including the normal supply valves, the second tank 12 is selected as the target of the specific control.

In the specific control, the failed first supply valve 21 is kept closed. In addition, the first communication valve 31 of the first tank 11 is opened. Additionally, the second communication valve 32 and the second supply valve 22 of the second tank 12 are opened. This allows forming a gas path G3 extending from the first tank 11 to the fuel cell 3 via the first communication valve 31, the communication pipe 42, the second communication valve 32, the second tank 12, the second supply valve 22, and the supply pipe 41. Therefore, the hydrogen gas in the first tank 11 can be supplied to the fuel cell 3 via the second supply valve 22 of the second tank 12.

It should be noted that the order in which the valves are opened may vary. For example, the first communication valve 31, the second communication valve 32, and the second supply valve 22 may be opened in that order, or all of them may be opened at the same time.

It should be noted that the third tank 13 may be selected as the target of the specific control. In this case, it is possible to form a gas path G4 extending from the first tank 11 to the fuel cell 3 via the first communication valve 31, the communication pipe 42, the third communication valve 33, the third tank 13, the third supply valve 23, and the supply pipe 41.

Effects

When the first supply valve 21 is failed, hydrogen gas cannot be supplied from the first tank 11 to the fuel cell 3 using the first supply valve 21. In the technique of the embodiment, the fuel gas storage system 2 includes the first communication valve 31, the second communication valve 32, the third communication valve 33, and the communication pipe 42. By using the first communication valve 31, the communication pipe 42, and the second communication valve 32, the hydrogen gas in the first tank 11 can be transferred to the second tank 12. Therefore, hydrogen gas can be supplied from the first tank 11 to the fuel cell 3 via the second supply valve 22 of the second tank 12 (see the gas path G3). In addition, by using the first communication valve 31, the communication pipe 42, and the third communication valve 33, the hydrogen gas in the first tank 11 can be transferred to the third tank 13. Therefore, hydrogen gas can be supplied from the first tank 11 to the fuel cell 3 via the third supply valve 23 of the third tank 13 (see the gas path G4). It is possible to effectively utilize the fuel gas stored in the first tank 11.

Note that when the second supply valve 22 is failed, a gas path via the first supply valve 21 of the first tank 11 or a gas path via the third supply valve 23 of the third tank 13 can be formed. This makes it possible to supply hydrogen gas from the second tank 12 to the fuel cell 3. In addition, when the third supply valve 23 is failed, a gas path via the first supply valve 21 of the first tank 11 or a gas path via the second supply valve 22 of the second tank 12 can be formed. This makes it possible to supply hydrogen gas from the third tank 13 to the fuel cell 3.

In the technique of the embodiment, the specific control is executed (S50) on the condition that it is determined that no hydrogen gas remains in the tank (second tank 12) including a normal supply valve (S30: NO). This allows the specific control to be executed when the pressure in the tank (second tank 12) including the normal supply valve is lower than the pressure in the tank (first tank 11) including the failed supply valve. Therefore, it is possible to appropriately transfer fuel gas in the tank including the failed supply valve to the tank including the normal supply valve by using a pressure difference. It is possible to effectively utilize fuel gas stored in the tank including the failed supply valve.

Second Embodiment

Figure 4:
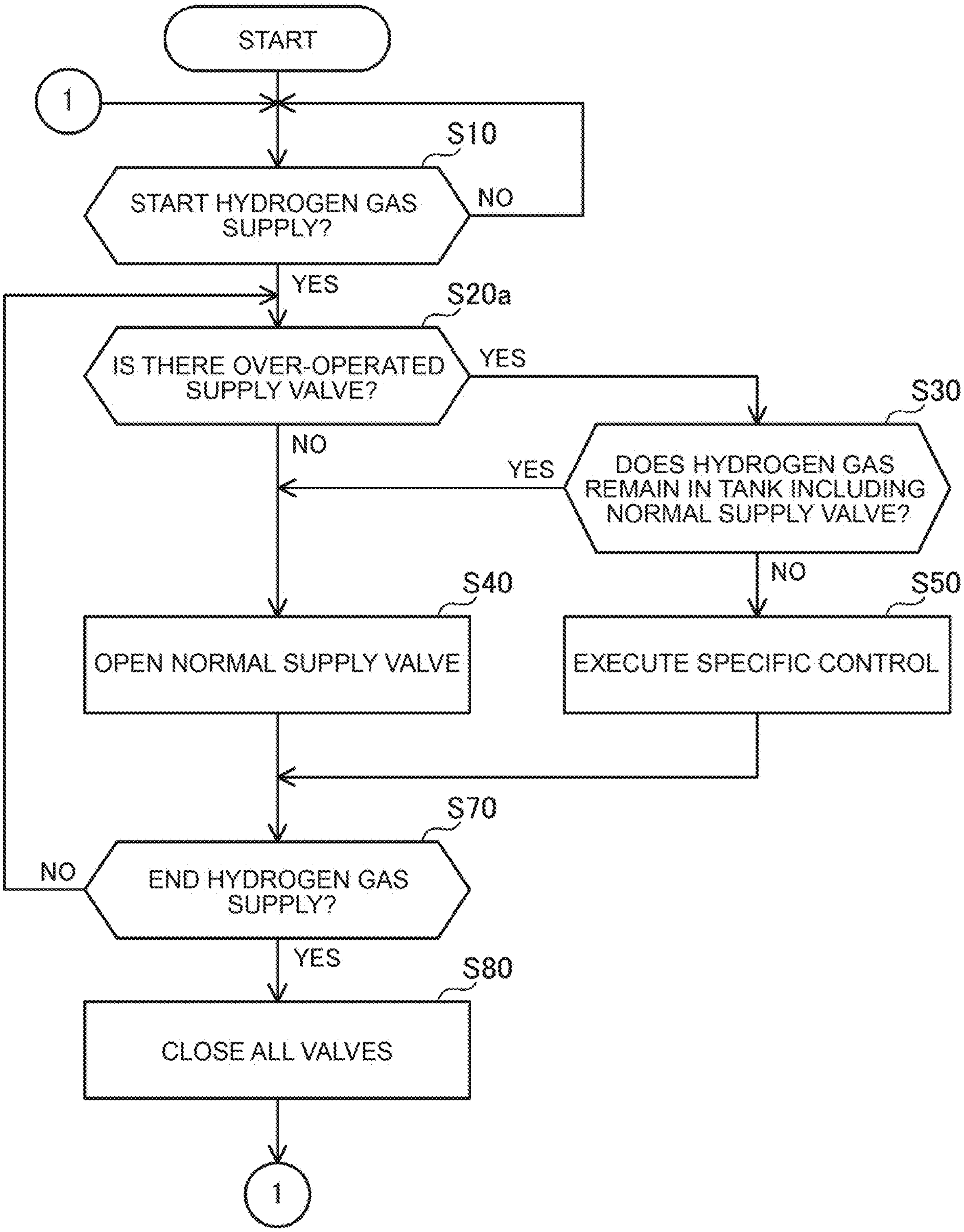
FIG. 4 is a flowchart illustrating an operation of the fuel gas storage system 2 in a second embodiment.

A second embodiment differs from the first embodiment in the conditions for executing the specific control. An operation of the fuel gas storage system 2 in the second embodiment will be described with reference to the flowchart of FIG. 4. Only the differences from the first embodiment will be described below.

In step S20*a*, the control unit 40 determines whether at least one of the first supply valve 21, the second supply valve 22, and the third supply valve 23 is over-operated. An over-operated supply valve is a valve with the cumulative number of operations that exceeds a predetermined number of times. The predetermined number of times may be determined in various ways. For example, the predetermined number of times may be a durability limit determined by the specifications of the first supply valve 21, the second supply valve 22, and the third supply valve 23, or may be the number of times obtained by subtracting a margin from the durability limit. Alternatively, for example, the predetermined number of times may be calculated each time based on the usage environment and operating time of the fuel gas storage system 2. When no supply valve is over-operated, (S20*a*: NO), the process proceeds to step S40. When there is an over-operated supply valve (S20*a*: YES), the process proceeds to step S30.

In step S50, the control unit 40 executes specific control. In the specific control, the over-operated supply valve is kept closed. In the specific control, the communication valve of the tank including the over-operated supply valve is opened, and the communication valve and the supply valve of the tank including the normal supply valve are opened. The detailed contents of the specific control have already been explained in the first embodiment. Accordingly, the explanation will be omitted here.

Effects

In a system in which a plurality of tanks is commonly connected to an external device via supply valves, when each of the supply valves is driven individually, an imbalance among the tanks occurs in the number of times the supply valves are operated. The supply valve that operates frequently will reach its durability limit earlier than the other supply valves, resulting in an over-operated supply valve. As a result, hydrogen gas cannot be supplied from the tank including the over-operated supply valve. Therefore, in the technique of the embodiment, hydrogen gas in the tank including the over-operated supply valve can be supplied to the fuel cell 3 via the tank including the normal supply valve. It is possible to make effective use of fuel gas stored in the tank including the over-operated supply valve.

In the technique of the embodiment, when there is an over-operated supply valve, use of the over-operated supply valve is stopped thereafter. Hydrogen gas in the tank including the over-operated supply valve can then be supplied using the normal supply valve. This makes it possible to correct the imbalance among a plurality of the supply valves in the number of times the supply valves are operated. The overall life span of the supply valves can be extended.

Although the embodiments have been described in detail above, these are merely examples and do not limit the scope of the claims. The technique described in the claims includes various modifications and variations of the specific examples exemplified above. The technical elements described in the present specification or in the drawings exhibit technical usefulness alone or in various combinations, and are not limited to the combinations described in the claims at the time of filing the application. In addition, the technique exemplified in the present specification or drawings can achieve a plurality of purposes at the same time, and achieving one of the purposes itself has technical usefulness.

Modification

In step S30, the condition for transitioning to execution of the specific control is not limited to "no hydrogen gas remaining in a tank including a normal supply valve". For example, the condition may be that "the pressure in a tank including a normal supply valve is lower than the pressure in a tank with a failed supply valve."

In this embodiment, the fuel gas storage system 2 includes three tanks, but the present disclosure is not limited to this. The technique in the present specification is also applicable when the fuel gas storage system 2 includes two tanks or four or more tanks. The technique in the present specification is also applicable when two or more supply valves are failed or are over-operated.

What is claimed is:

1. A fuel gas storage system comprising:

a first tank configured to store fuel gas and including a first supply valve and a first communication valve, the first supply valve being disposed at a first end of the first tank, and the first communication valve being disposed at a second end of the first tank that is opposite to the first end in a longitudinal direction of the first tank;

a second tank configured to store the fuel gas and including a second supply valve and a second communication valve, the second supply valve being disposed at a first end of the second tank, and the second communication valve being disposed at a second end of the second tank that is opposite to the first end in a longitudinal direction of the second tank;

a supply pipe connecting the first supply valve and the second supply valve to an external device;

a communication pipe connecting the first communication valve and the second communication valve to each other; and a control unit configured to control an opened-closed state of each of the first supply valve, the second supply valve, the first communication valve, and the second communication valve, wherein the control unit is configured to execute specific control to close the first supply valve, and open the first communication valve, the second communication valve, and the second supply valve such that the fuel gas stored in the first tank flows to the external device via the first communication valve, the communication pipe, the second communication valve, the second tank, the second supply valve, and the supply pipe.

2. The fuel gas storage system according to claim 1, wherein the control unit is configured to execute the specific control in a case where a failure of the first supply valve is detected.

3. The fuel gas storage system according to claim 1, wherein:

the control unit is further configured to detect the number of times the first supply valve is operated; and the control unit is configured to execute the specific control in a case where the number of times the first supply valve is operated exceeds a predetermined number of times.

4. The fuel gas storage system according to claim 1, wherein the control unit is configured to execute the specific control in a case where pressure in the second tank is lower than pressure in the first tank.

5. The fuel gas storage system according to claim 1, wherein the control unit is configured to sequentially open the first communication valve, the second communication valve, and the second supply valve.

* * * * *